United States Patent
Ping et al.

(10) Patent No.: US 9,253,232 B2
(45) Date of Patent: *Feb. 2, 2016

(54) SYSTEM AND METHOD FOR UNINTERRUPTED STREAMING

(75) Inventors: Hai-Feng Ping, Issaquah, WA (US); Haydon Boone, Sammish, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,691

(22) Filed: Mar. 15, 2011

(65) Prior Publication Data

US 2011/0167169 A1 Jul. 7, 2011

Related U.S. Application Data

(63) Continuation of application No. 10/793,018, filed on Mar. 3, 2004, now Pat. No. 7,925,771.

(60) Provisional application No. 60/451,975, filed on Mar. 3, 2003.

(51) Int. Cl.
| | |
|---|---|
| *G06F 15/16* | (2006.01) |
| *H04L 29/06* | (2006.01) |
| *H04L 29/14* | (2006.01) |

(52) U.S. Cl.
CPC ............ *H04L 65/4092* (2013.01); *H04L 65/80* (2013.01); *H04L 69/40* (2013.01)

(58) Field of Classification Search
CPC ..... H04L 69/40; H04L 65/80; H04L 65/4092; H04N 21/4314; H04N 21/658; G06F 11/07
USPC ......... 709/203, 217, 227, 231, 238, 223–224, 709/232, 239; 714/1, 2, 4, 15
See application file for complete search history.

(56) References Cited

U.S. PATENT DOCUMENTS

| | | | | |
|---|---|---|---|---|
| 5,734,810 | A * | 3/1998 | Tanaka et al. ................... | 714/4.1 |
| 5,838,909 | A * | 11/1998 | Roy et al. ....................... | 709/209 |
| 5,991,894 | A * | 11/1999 | Lee et al. ....................... | 714/6.31 |
| 6,055,568 | A * | 4/2000 | Adams ........................... | 709/221 |
| 6,195,680 | B1 * | 2/2001 | Goldszmidt et al. ........... | 709/203 |
| 6,401,239 | B1 * | 6/2002 | Miron ............................. | 717/173 |
| 6,766,373 | B1 * | 7/2004 | Beadle et al. .................. | 709/227 |
| 6,810,263 | B1 * | 10/2004 | Cheng et al. ................... | 455/510 |
| 6,920,497 | B1 * | 7/2005 | Bourassa et al. .............. | 709/227 |
| 7,133,891 | B1 * | 11/2006 | Uceda-Sosa et al. .......... | 709/203 |
| 7,318,107 | B1 * | 1/2008 | Menon ........................... | 709/239 |
| 2001/0013068 | A1 * | 8/2001 | Klemets et al. ................ | 709/231 |
| 2002/0060994 | A1 * | 5/2002 | Kovacs et al. .................. | 370/328 |
| 2002/0073211 | A1 * | 6/2002 | Lin et al. ........................ | 709/229 |
| 2002/0138845 | A1 * | 9/2002 | Hoang ............................. | 725/90 |
| 2002/0143973 | A1 * | 10/2002 | Price ............................... | 709/231 |
| 2002/0161797 | A1 * | 10/2002 | Gallo et al. ................. | 707/500.1 |

(Continued)

*Primary Examiner* — Oanh Duong
(74) *Attorney, Agent, or Firm* — AEON Law; Adam L. K. Philipp

(57) ABSTRACT

A streaming media presentation transmission error recovery system and network. In one embodiment, in the event of a connection failure to a selected server, an alternative "mirrored" server is selected to resume the transmission of a selected streaming media presentation. One embodiment of the present invention provides for transparent switching from an interrupted media data stream to a stream from a newly-created network connection by providing an overlap between media that has been received and the data that is received via the new connection.

18 Claims, 7 Drawing Sheets

(56) References Cited

U.S. PATENT DOCUMENTS

| | | | |
|---|---|---|---|
| 2002/0161853 A1* | 10/2002 | Burak et al. | 709/218 |
| 2003/0005040 A1* | 1/2003 | Kukkal | 709/203 |
| 2003/0084165 A1* | 5/2003 | Kjellberg et al. | 709/227 |
| 2003/0146977 A1* | 8/2003 | Vale et al. | 348/207.1 |
| 2003/0236905 A1* | 12/2003 | Choi et al. | 709/231 |
| 2004/0019674 A1* | 1/2004 | Stevens et al. | 709/224 |
| 2004/0039834 A1* | 2/2004 | Saunders et al. | 709/231 |
| 2004/0078626 A1* | 4/2004 | Li | 714/4 |

\* cited by examiner

INTERRUPTION OCCURRED AT t=47

AUDIO TIMESTAMPS: ... t=10 t=10 t=20 t=20 t=30 t=30 t=40 t=40

VIDEO TIMESTAMPS: ... t=5 t=5 t=5 t=5 t=25 t=25 t=25 t=25 t=45 t=45 t=45 t=45

LARGEST GAP = 20
LAST TIME MARKER WITH EARLIEST TIME = 40
SEEK POINT FOR NEW CONNECTION = 20

*FIG. 5*

SYSTEM AND METHOD FOR UNINTERRUPTED STREAMING

CROSS-REFERENCE TO RELATED APPLICATIONS

The present application is a continuation application of U.S. Pat. No. 7,925,771, "SYSTEM AND METHOD FOR UNINTERRUPTED STREAMING," naming Hai-Feng Ping and Haydon Boone as the inventor(s), filed Mar. 3, 2004 and issued on Apr. 12, 2011; which application claims priority from U.S. Provisional Patent Application No. 60/451,975, filed Mar. 3, 2003, the present application claims the benefits of priority under 35 USC §119 and/or USC §120 to the above-listed application(s), the entirety/ies of which are hereby incorporated by reference.

BACKGROUND OF THE INVENTION

1. Field of the Invention

The described subject matter relates to presentation of streaming media data over a network.

2. Description of the Related Technology

Various systems exist for the streaming of media presentations and other data over a computer network. Because these systems utilize network connections, the performance of many of them is to a large part negatively affected by changes in the network integrity. For example, in many systems, a failed physical connection in a network (e.g., a line outage or a failed router) can cause a permanent break in a network connection, preventing streamed data from being received. If the data is for a streaming media presentation, this interruption can, in many systems, cause the presentation to cease before it has completed, frustrating users. In other systems, the administrative needs of the content provider may cause a data server to be taken offline. Again, this can cause unwanted cessation of data flow.

Others have described systems for handling transmission errors in connection with file transfer protocols. For example, see U.S. Pat. No. 6,049,892, to Casagrande, et al. and U.S. Pat. No. 6,381,709, to Casagrande, et al. However, there is a need for a system and method that provides for increased reliability of streaming data connections with fewer instances of stopping or pausing.

BRIEF DESCRIPTION OF THE DRAWINGS

A computer-implemented connection and presentation system will now be described with reference to the following drawings:

FIG. 5 is a block diagram illustrating an exemplary series of time markers recorded from packets received from an interrupted connection.

DETAILED DESCRIPTION OF THE EXEMPLARY EMBODIMENTS OF THE INVENTION

The aspects, features and advantages of the invention will be better understood by referring to the following detailed description in conjunction with the accompanying drawings. These drawings and the associated description are provided to illustrate embodiments of the invention, and not to limit the scope of the invention. The embodiments described below overcome obstacles to reliable presentation of streaming media over a network.

Figure 1:
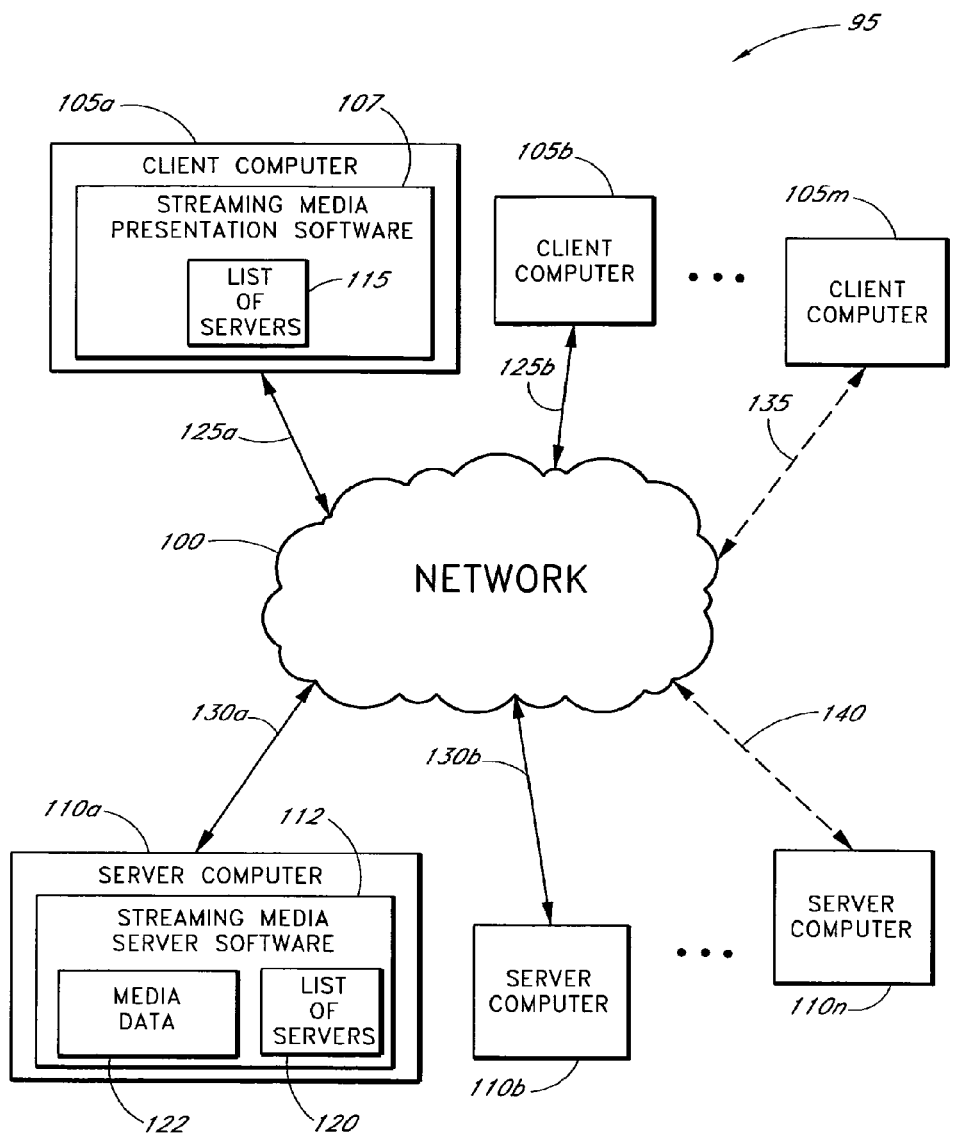
FIG. 1 is a block diagram illustrating a system for transmitting a streaming media presentation from server and client computers that are interconnected on a network.

FIG. 1 shows a common configuration of processing apparatuses interconnected so that media files may be streamed over a communication network 100. In one embodiment, the processing apparatuses comprise a set of client and server computers. The communication network 100 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDD1) or Asynchronous Transfer Mode (ATM). Note that computing devices may be desktop, server, portable, hand-held, set-top, or any other desired type of configuration. As used herein, the network includes network variations such as the public Internet, a private network within the Internet, a secure network within the Internet, a private network, a public network, telephone or telecommunications network, fiber, DSL, wireless or cable network, a value-added network, an intranet, and the like. Streaming media data may include text, audio and/or visual information that is transmitted over a network and received for presentation by a computer contemporaneously in time with respect to receiving the media data. Streamed media data may not have a start point or an end point and may just be a continuous stream of data from such sources as a "live" stream. A streaming media presentation may include the displaying for viewing or listening of streaming media data.

FIG. 1 illustrates a system 95 comprising a plurality of client computers 105a-m, running streaming media presentation software 107. In one embodiment, the system may utilize as few as one client computer. FIG. 1 also shows a plurality of server computers 110a-n, each running streaming media server software 112. In one embodiment, there only need be one server computer 110.

The client computers 105a-m and the server computers 110a-n may each include a conventional general purpose single- or multi-chip microprocessor, including by not limited to a Pentium® processor, a Pentium® Pro processor, a 8051 processor, a MPS® processor, XScale™ processor, a PowerPC® processor, or an ALPHA® processor. In addition, the microprocessor may be any conventional special purpose microprocessor such as a digital signal processor.

Each instance of streaming media presentation software 107 may be configured to receive streaming media data from a particular server 110, although it is not necessary to dedicate one server for each client, as will be understood. For the sake of clarity, in FIG. 1 only one client computer 105a and one server computer 110A have been illustrated along with their associated software, although it will be appreciated that the streaming media presentation software may run on any or all of the client and server computers. In one embodiment, the streaming media presentation software 107 includes modules designed for connection to a streaming media server and reconnection to a server after connection interruption, as will be described below. In addition, in one embodiment, the software is maintained as instructions on a computer readable medium.

The streaming media server software 112 incorporates media data 122, which may be streamed to client computers for playback. In one embodiment, streaming media data is audio or video data that is encoded in such a way that it can be sent to a presentation application as a continuous stream and presentation of the data can begin on a client computer 105a before the entirety of the data is transmitted. Additionally, the streaming media server software 112 may incorporate a list of server information 120, which, in one embodiment contains network addresses of servers configured to stream media data 122. In another embodiment, this list contains the address of the server it is stored on, or alternatively points only to other servers. Also, it will be recognized that the system 95 may contain anywhere from one to a large number of servers, and that some servers may not maintain a list at all. The process through which the list is created could be created by any number of techniques, (for example polling of servers contained in a common local network, or hard coding by the maintainer of the server) as would be understood by someone of ordinary skill in the art.

Similarly, the streaming media presentation software 107 may maintain a client list 115 of server information, which comprises addresses of servers configured to stream media data 122, and may contain addresses on the server where the media data is located. Such media data may then be presented to a user. As with the list contained on the server, the client list 115 of server information may contain only one server address or may contain information on a plurality of servers. Also, the client list 115 may contain information on the server from which the client is originally configured to stream a presentation, or may contain only information about different servers. In different embodiments, the client list 115 contained on the client may be created in different ways. In one example, the entries in the list may be entered by a user. In other embodiments, the client list 115 may be obtained from a server at the time the client initially connects with the server, or may be sent to the client by a connected server later along with a disconnection alert, if the server later knows it is going to go offline.

The streaming media server software 112 and the streaming media presentation software 107 may be written in any programming language such as C, C++, BASIC, Pascal, Java, and Fortran and ran under any operating system and stored on a computer readable medium, such as a ram, cd-rom, compact disk or hard disk or optical disk drive. C, C++, BASIC, Pascal, Java, and Fortran are industry standard programming languages for which many commercial compilers can be used to create executable code.

Each of the client computers 105a-105m is connected to the communication network 100 through a two-way connection, such as two-way connections 125a and 125b, so that it may receive data from the server and in turn send messages. Similarly, servers have associated two-way connections; FIG. 1 illustrates two-way connections 130a and 130b, through which they may stream data to a client. As will be understood by one of ordinary skill in the art, there are a number of variations on the method through which the client and server computers may communicate with each other. In one embodiment these "connections" are not dedicated connections at all, but are rather performed through UDP/IP or TCP/IP messaging over packet-switched networks. In one embodiment, a connection is a datapath, which may be socket fed, for transferring data from one location to another. For example, a connection may be created using socket-layer networking software to better manage network communications and to identify networking errors. Other embodiments utilize communications channels that are fixed physically or through certain channel characteristics, such as, an electromagnetic frequency. One example of a streaming media connection is provided in the RealOne Player and Helix Universal Server software produced by RealNetworks, which utilizes packet-switched UDP/IP and TCP/IP protocols to send media packets, after an initial handshaking protocol where parameters for a streaming media presentation may be agreed upon and set.

Occasionally, a client connection 135 or server connection 140 may be jeopardized. This problem may be as simple as a simple slowing-down of a network, or sometimes greater where packets may be lost or late in arriving. Instead, sometimes conditions are poor enough that the client and server can no longer maintain the connection they have established and the connection may be terminated. This may occur, for example, due to a physical break in the network or telecommunications line, an overtaxed router or client computer, a failed router or other network connectivity equipment, a server failure, or a server being taken offline for repair or maintenance. When this happens, a network socket error may be returned by networking software at the client computer, informing the client software that a connection cannot be maintained. Alternatively, the connection may be jeopardized when a server informs the client, though a warning message that the server will be going offline. In another case, client may make a determination, based on perceptions of network speed, that a connection may not be maintained efficiently. In yet another case, the client may make a determination that a connection is jeopardized by failing to receive a timely response to one or more messages sent over the connection. In both of these latter cases, the client may maintain parameters that specify minimum response time or network traffic speeds. The parameters for these determinations may be set by the authors of the streaming media presentation software 107, may be set by the authors or users of a client computer operating system, or, in another embodiment, may be customizable by a user.

Figure 2:
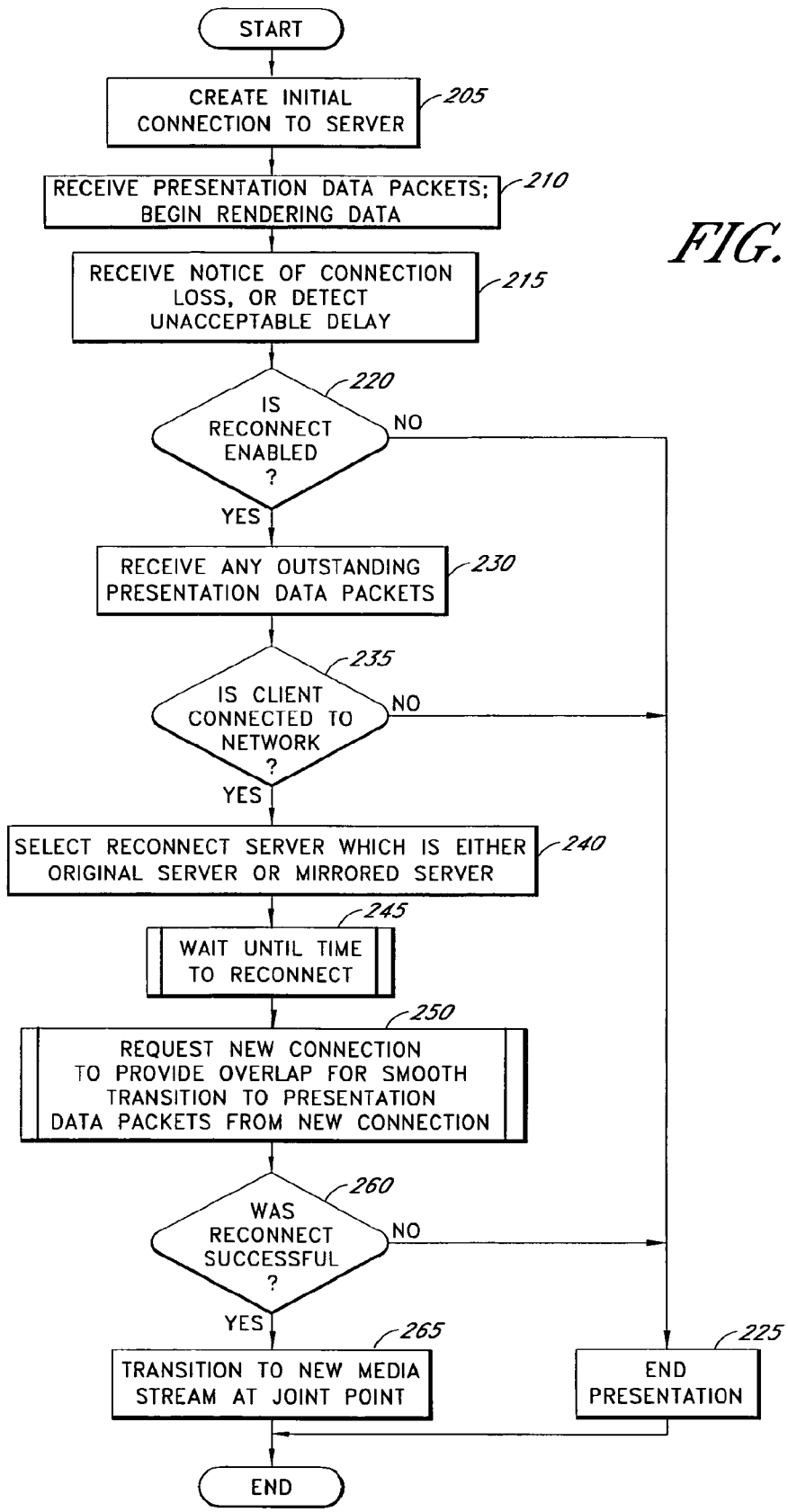
FIG. 2 is a flowchart illustrating, in one embodiment of the invention, a process that is performed by the system of FIG. 1 for creating an initial network connection to receive a streaming media presentation, detecting an error, and creating a new network connection.

FIG. 2 is a flowchart illustrating an exemplary process through which the streaming media presentation software 107 begins a streaming media presentation, detects an interruption in an associated network connection, creates a new connection, identifies a start point for retransmission, and identifies a joint point between the data provided by the original and new connection in order to continue playing the presentation. Depending on the embodiment, additional steps may be added, others removed, selected steps merged, and the ordering of the steps rearranged. For convenience of description, the process of FIG. 2 is described below with respect to the client computer 105a and the server computer 110a. However, it is to be appreciated that the same processes occur on client computers 105b-m and server computers 110b-n. Particular attention should be made with respect to the description of steps 240-265 wherein is described an innovative method for resuming an interrupted streaming media presentation.

Starting at a step 205, the client computer 105*a* initially creates a connection to the server computer 110*a*. It will be understood that the term "initial" in the context of the described system is used for ease of description, and is not limited to only those connections made at the very start of a streaming media presentation. In one embodiment, this initial connection may be the very first one made between the two machines. In another embodiment, the initial connection may be performed after detection of a network error, computer error or after the client computer 105*a* determines that a connection should be made with a new server computer. Next, after the initial connection is successfully created, at a step 210, the client computer 105*a* begins to receive media data packets and begins to present the media data by rendering it. In one embodiment, media data is presented by rendering it as video; in another embodiment media data is presented by rendering it as audio. In yet another embodiment, media data may be presented as one or more still images, or even text. Next, at a step 215, the client computer 105*a* receives notice that the initial connection cannot be sustained. As mentioned earlier, this can be done through a number of different ways. In one embodiment the client computer 105*a* determines that there is no connection possible when the physical connection to the network is broken. This might include, for example, the client computer 105*a* detecting loss of connection through the receipt of a network or internal PC performance error (e.g. memory error) from the operating system or the client computer 105*a* itself polling the network to see that the connection is lost. In another embodiment, loss of connection may be indicated to the client computer 105*a* by the following: where termination of the streaming has not occurred, an unacceptable delay in the receipt of the streaming data; unacceptably slow transmission speeds on the communication network 100; a data request made by the client times out; or an alert from the connected server that the server is scheduled to go offline for maintenance or repair.

After detection of a connection problem in step 215, the client computer 105*a* proceeds to a decision step 220 and determines whether reconnection is enabled for the client computer 105*a*. Reconnection may be client-configurable (or client operating system configurable) to enable users to opt out of attempting a new connection depending on how the user set its operating system preferences. In another embodiment, reconnection may be server-configurable so that a server may disable the reconnection feature when the initial connection is made at step 205. If reconnection is not enabled, the process proceeds to a step 225 and finishes. However, if reconnect is enabled, the client computer 105*a* proceeds to a step 230 and receives any data packets that are en route. In this and other cases, there is opportunity to receive more data before creating a new connection. In one embodiment, data packets may have been received and stored in a buffer in the client buffer 105*a* but may not have yet been transmitted to the streaming media presentation software 107. While not required by the system, ensuring that as many packets of data as possible get received is more likely to result in a smooth and uninterrupted a process for a viewing user.

Next, at a decision step 235, the client computer 105*a* may determine whether it is connected to the communication network 100. This may not be the same as detecting whether or not the original connection between the client and server is still successful. In many situations where a client is still connected to a network, a particular client-server connection could be lost or very slow (large latency between receipt of media data packets) while other connections between the client and various network points are running smoothly. In others, there may be a physical break between a client and a network, in which case there might be no possibility of creating a new connection. The creation of a new connection may be useful if there is a general network error or if a server is down, in which case a new network path or server might be found. However, if there can be no connection at all from a client to a network, then it may be impossible to create a new connection with any server. In one embodiment the client computer connection to the network could be tested. This can be done in numerous ways. For example, this determination may be made through the use of the standard network socket API, or through "pinging" a known address on the network. In another embodiment, if the initial connection was over a modem and the client computer 105*a* detects if the modem is no longer connected, then the client computer 105*a* may issue a new dial-up connection to determine whether the client computer 105*a* can connect to the network. Alternately, the client computer 105*a* may not conduct a test to determine if it is connected to the network or to a server. The client computer 105*a* may just assume it is connected an proceed with establishing a new connection to the server.

If the client computer 105*a* determines that it is not connected to the communication network 100, the presentation is ended at step 225 and the procedure is finished. If instead a connection to the network is found or if the client assumes a connection, a reconnect server is selected at a step 240. The reconnect server may be selected from the client list 115, if applicable, or the client computer 105*a* may simply attempt to reconnect to the server it was originally connected to. In another embodiment, the client computer 105*a* utilizes preferred servers that it has connected with successfully in the past, by retaining a history of successful or failed connections, and consulting this history at the time of selection. In another embodiment, the server computer 110*a* may provide a list of alternative servers at the time of initial connection, and the client computer 105*a* consults its own connection history to determine which of the server computers on the list are most likely to provide a successful connection. Alternatively, the client computer 105*a* may select a specific alternate server that has been identified by the server with which it was originally connected. In one embodiment, if either the list kept by the client computer 105*a* or provided by that server computer 110*a* has multiple entries with the same high preference rating, then the client computer 105*a* may choose one at random. Continuing to a step 245, the client computer 105*a* may compute a time at which it is the most advantageous to reconnect, and waits until this time to continue. This time may be provided by the server or alternately set by the client computer (automatically or manually upon an input from the user). An exemplary process of computing this time is described in greater detail below in the discussion with respect to FIG. 3.

After waiting for the proper time to create a new connection, the client computer 105*a* then, in a step 250, requests a new connection from the server selected in step 240 and may switch the presentation to that data that is being received from the new connection. An exemplary process for performing this is described in greater detail below in the discussion with reference to FIG. 4. As will be further explained below, in one embodiment of the invention, it is desirable to choose a seek point that creates some overlap between the new connection and data already received from the initial connection. This is desirable over simply switching to the new connection at the time all of the data already received has been rendered because it allows a more transparent switch to be made between the two. One reason the overlap may be supported is because servers cannot always supply presentation data that begins at the exact seek point; were there to be no overlap and the client computer 105a to switch over as soon as the seek time occurred, a skip in the presentation might occur.

After this request, in a decision step 260, the client computer 105a may determine if the reconnect was successful. If not, the client computer 105a may end the presentation at step 225, and finishes. If the reconnect was successful, the client computer 105a may continue playing the presentation from the new server at a step 265 and the process completes.

In an alternate embodiment, the client computer may request a new connection before the detection of a connection problem to one or more servers other than the one to which the initial connection was made or to the server that the original connection was made. Thus, in this embodiment, before the detection of a connection problem, the client computer 105a may receive two parallel data streams from different server computers, one for rendering and one as a "safety net," and can therefore switch over to the new connection as soon as a problem is detected.

Figure 3:
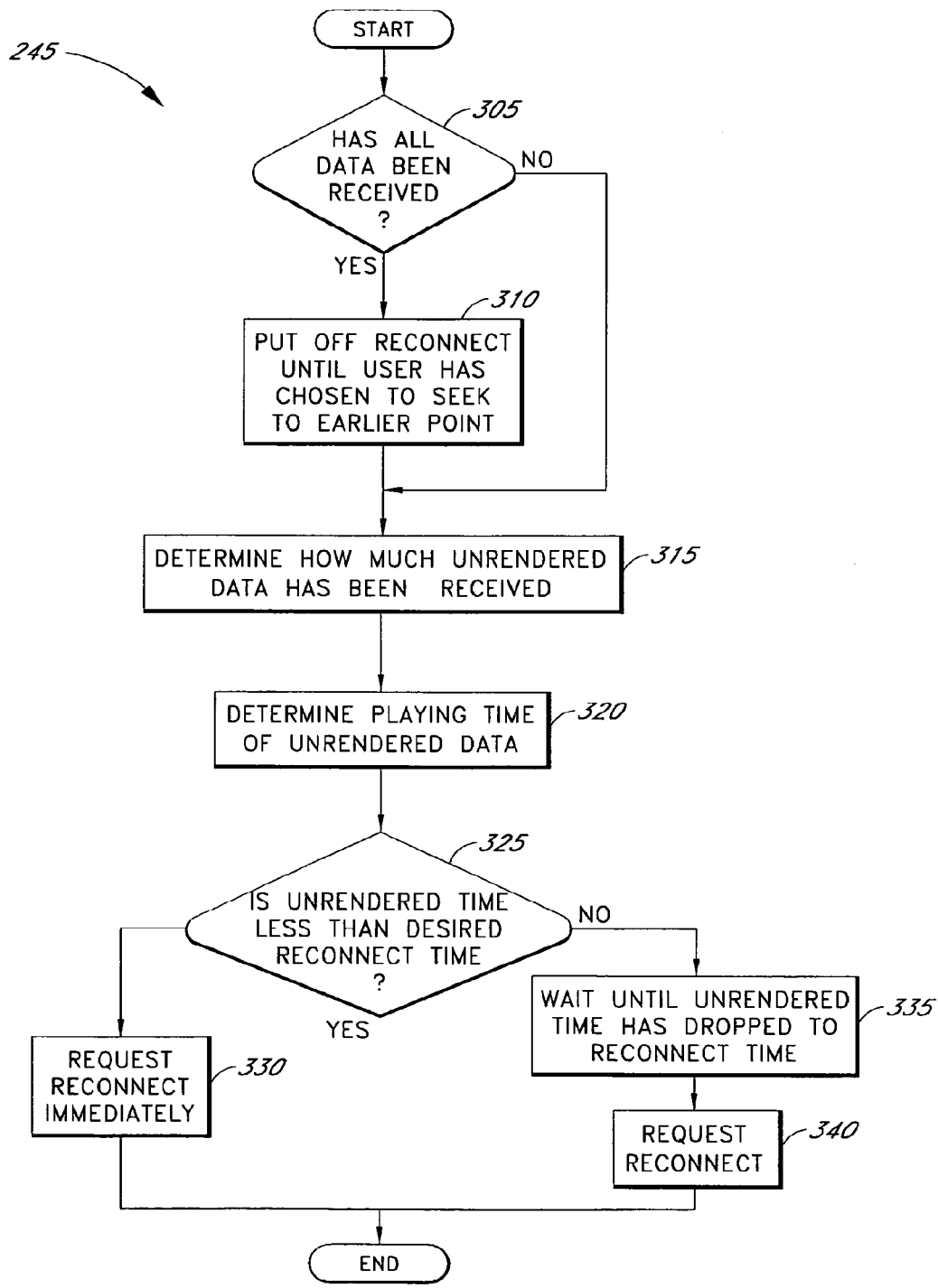
FIG. 3 is a flowchart illustrating, in one embodiment of the invention, a process that is performed by the client computers of FIG. 1 for determining when to request a new connection.

FIG. 3 is a flowchart illustrating an exemplary process through which the client software computes a waiting time before initiating a new streaming media connection. FIG. 3 illustrates certain steps that, in one embodiment, occur in step 245 of FIG. 2. Depending on the embodiment, additional steps may be added, others removed, selected steps merged, and the ordering of the steps rearranged.

Starting at a decision step 305, the client computer 105a (or the operating system residing on the client computer) may review the media data received from the initial connection to determine whether the entirety of media data 122 has been received. The client computer may monitor the media data packets individually or alternatively may just determine that all data packets have been received. In the situation where the entire streaming media data for presentation has been received, the client computer 105a delays creating a new connection until a user chooses to perform a seek request to an earlier point (or time) in media data 122. One benefit of waiting before reconnecting is that when the entirety of the media data 122 has been received, there may not necessarily be a need for a client and server to continue to send data between themselves. By not opening unneeded connections, system and network resources are more efficiently utilized. Thus, if it is determined in decision step 305 that all the media data has been received, the client computer 105a waits at a step 310 until a user requests that the presentation be played from an earlier, non-buffered point.

If either there is data still left in the presentation that has not been received (decision step 305) or a user has requested the presentation be played from an earlier point (step 310), the client computer 105a proceeds to a step 315 and determines how much unrendered data has been received via the initial connection prior to a fault in the connection. The client computer 105a then, at a step 320, may determine how long the unrendered data can be played. At a decision step 325, the client computer 105a compares the buffer time with the desired reconnect time to determine which is longer.

In one embodiment of the invention, the desired reconnect time may be the minimum amount of time the client computer 105a predicts the creation of a new connection will take to complete. It is useful for the client computer 105a to have a value for this parameter because it allows the client computer 105a to delay making the new connection for as long as would be prudent. This increases the probability that network or server problems will be resolved before the new connection is attempted. In some embodiments, the desired reconnect time may be hard-coded into the client computer 105a and may be pre-selected to be longer than the time needed for the creation of most foreseen connections. In other embodiments, however, the client computer 105a may keep track of the amount of time needed to create the initial connection, and base the desired reconnect time on that. Other embodiments may allow for a user or client operating system to set the desired reconnect time, or for a server alert to include a recommendation of a desired reconnect time.

If, at decision step 325, the client computer 105a may determine that playing time of the unrendered data is less than the desired reconnect time, a new connection may be requested immediately at a step 330. In one embodiment, this connection may be requested immediately so that upon establishing the new connection, if successful, the client computer can begin playing data as soon as possible after the buffered portion of the presentation ends. Referring again to the decision step 325, if the playing time of the buffered data is more than the desired reconnect time, however, the client computer 105a may wait at a step 335 until buffer time has dropped to the desired reconnect time. After that is achieved, the client computer 105a may request a new connection at a step 340 and finishes.

Figure 4:
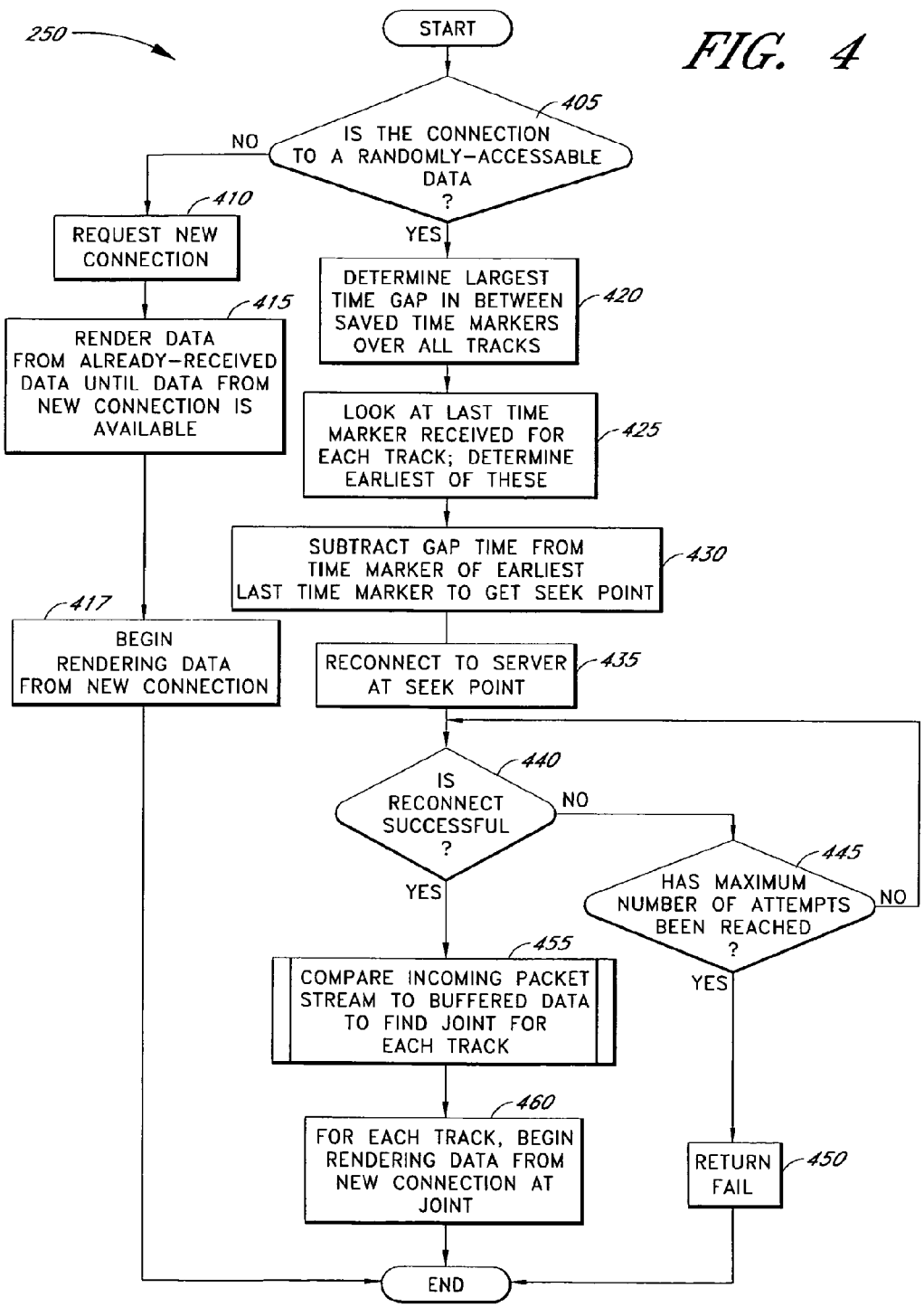
FIG. 4 is a flowchart illustrating, in one embodiment of the invention, a process that is performed by the client computer of FIG. 1 for creating a new streaming media connection.

FIG. 4 is a flowchart illustrating an exemplary process through which the streaming media presentation software 107 decides how to request a new connection and at what point the client computer 105a will switch over to the new connection. FIG. 4 illustrates certain steps that occur in step 250 of FIG. 2. Depending on the embodiment, additional steps may be added, others removed, selected steps merged, and the ordering of the steps rearranged.

Beginning at a decision step 405, the client computer 105a may determine whether the presentation is live or randomly-accessible. In some embodiments, a server may offer access to presentations that can be viewed at any time and whose contents may be randomly accessed, and may also offer access to presentations that are generated live and which can only be accessed from a real-time stream. Because these presentations offer different options for creating a user-transparent experience, it may be desirable to recognize a difference in them for the purposes of creating a new connection.

If, in decision step 405, the presentation is found to be not randomly-accessible, the client computer 105a may immediately request a new connection from the selected server in a step 410. In one embodiment, the client computer 105a may request the use of a new networking protocol than that used for the initial connection. For example, if the client computer 105a was receiving streaming media presentation data originally over a packet-switched network utilizing the UDP transport layer protocol, it can determine that it would be advantageous to make the request for the new connection using TCP, a different transport layer protocol which provides error-checking, instead. As will be understood, the use of TCP may lessen the possibility of packet loss, and would thus be a preferred alternative once it was discovered that a UDP connection had failed. The client computer 105a then may continue to a step 415 where the presentation continues to be rendered from that data received over the initial connection until new connection data is available. Next, at a step 417, the client computer 105a may begin playing the data from the server established with the new connection. While this jump into the data from the new connection will sometimes result in a noticeable skip in the presentation, creating the new connection as soon as possible may still provide the user with a smoother, less-interrupted experience than would occur if the presentation were to simply stop at the time the initial connection was lost.

However, if the client computer 105a determines in decision step 405 that the media presentation is randomly-accessible, it may be possible to ask for the presentation received over the new connection to start transmitting media data from any point in time desired. Because the client computer 105*a* will transmit to the server a point for the presentation to begin at, it should determine a suitable point. For ease of description, the point in time in the stream of media data that is chosen and transmitted to the server for the new connection to begin at will be called the "seek point." In particular, it might be desirable to choose a seek point that creates some overlap between the new connection and data already received from the initial connection. In one embodiment, this is desirable over simply switching to the new connection at the time all of the data already received has been rendered because it allows a more transparent switch to be made between the two. One reason the overlap may be supported is because servers cannot always supply presentation data that begins at the exact seek point; were there to be no overlap and the client computer 105*a* to switch over as soon as the seek time occurred, a skip in the presentation might occur. Another reason is that there might occur small network errors after the new network connection is made that result in the loss of a few pieces of information. In these, and other, cases it is helpful to have a large-enough amount of overlap so that a convenient "switchover time" may be found where the client computer 105*a* may switch rendering from one connection to another without missing any packets.

It is desirable for the client computer 105*a* to choose the amount of time for an overlap so that a proper seek point may be computed. As part of this, the client computer 105*a* analyzes the data packets that have been received for the presentation. In the preferred embodiment, a streaming media presentation may be broken up into discrete data packets, each of which has an associated time marker that tells the streaming media presentation software 107 at what time the packet should be rendered to the user. In one embodiment of the invention, a packetizer at the server computer 110(*a*) transmits each of the data packets in the requested media data 122 with a time stamp that is based upon information in the media data 122 which indicates when the respective portion of the media data 122 should be displayed to a user. In one embodiment of the invention, the packetizer is an application program. The time marker may be totally unrelated to the number of packets or amount of media data that has been received by the client computer. As will be understood, some embodiments of streaming media presentations will include more than one packet with a particular time marker, along with information on the number of packets sent for each point in time, allowing the presentation software to combine these at the indicated time. One example of this can be found in FIG. 5, discussed in more detail later, which shows the time markers for a series of packets, with multiple packets having the same time marker.

In the illustrated embodiment, the time stamps for the last 30 of these packets may be held by the client computer 105*a*, even if the packets themselves have been rendered and their presentation data discarded. This allows enough time marker data to be held to satisfactorily compute an overlap without wasting system resources by continuing to hold on to used presentation data. It will be recognized that the exact number of held-back time markers may be changed by the system developer, or even the user, without modifying inventive aspects of the system. In addition, some embodiments may retain entire data packets.

In addition, some embodiments have presentations that. comprise multiple separate "tracks" with each containing its own set of packets that are combined during rendering. One example of this might be an audio/video presentation that comprised one audio track and one video track. Another might be a stereo audio presentation with separate tracks for left and right audio channels.

When creating an overlap, it may be useful to make the overlap big enough that it would compensate the time gaps between successive packets; if there were a large time gap between the requested seek time and the first data packet in a particular track, it would be desirable to increase the overlap time to be at least as long as this gap time. Thus, in a step 420, the client computer 105*a* may look at the time markers retained for each individual track, compares them to find the largest gap in between successive time markers for each track, and then find the biggest of these gaps over all of the tracks. It is desirable to find the biggest gap amongst the retained time markers because this may reasonably approximate the maximum of any time gap between packets received from the new connection.

Additionally, when creating an overlap, it may be useful to make sure that the overlap would encompass the last packet received in each track. Thus, in a step 425, after the largest gap is found, the client computer 105*a* then looks at the latest time marker for each track and determines which of these latest-time markers has the lowest time marking. This, in effect, allows the client computer 105*a* to determine which of the tracks "ends" first out of all the data already received. Then, in a step 430, the client computer 105*a* computes where the overlap should begin by subtracting the gap time found in step 420 from the time marker found in step 425. This point where the overlap should begin may be the seek point. The seek point may be determined in this way so that the new connection should at least overlap with each of the last-received packets from the initial connection, and so that if there is a large time gap in between two packets received over the new connection, it may be compensated for by the subtraction of the gap from step 420.

FIG. 5 illustrates one example of how the process illustrated in FIG. 4 might determine a seek point. FIG. 5 illustrates the last few in a series of time markers saved from packets received before a connection was interrupted at time t=47. T may be any random number indicating a relative time or order, time the data was encoded, number of the packet that was encoded, may include a time of day stamp or may be the actual time the packet was transmitted from a server. The stream of media data that was received over the connection, as illustrated, comprises an audio track and a video track. The illustrated audio time markers may be included with the media data and may be spaced apart every 10 time units, with the last arriving with time marker t=40. The illustrated video time markers may be spaced apart every 20 units, with the last arriving marker at t=45. In the example, the largest gap between any two successive time markers is in the video stream, and is 20 time units; this would be determined in step 420 of FIG. 4. The latest time marker for the audio track is t=40 and the latest time marker for the video track is t=45. Thus, in step 425, the client computer 105*a* would choose t=40 as the earliest of the last time markers for each track. And so, in step 430, the client computer 105*a* would subtract 20 from 40 to find a seek point of t=20.

Returning to FIG. 4, once the seek point is found, a new connection may requested at a step 435. In a similar fashion to the new connection request at step 417, in some embodiments the client computer 105*a* may choose to utilize a different networking protocol for the new connection than was used for the initial connection. After the new connection is requested in step 435, the client computer 105*a*, at a step 440, may determine whether the connection has been successfully made or just assume that there was a successful connection. If it the client determines that the connection is not successful, then, at a step 445, the client computer 105a may determine whether the maximum number of reconnect attempts has been made. The maximum number of reconnect attempts may be hard set to zero. If the number of reconnect attempts is set to a number other than zero, the user or administrator may set a maximum number of retries before deciding that a new connection cannot be made. If the maximum number has been reached, the client computer 105a returns a failure code at a step 450 and stops attempting to make new connections. If the maximum number has not been reached, the client computer 105a returns to step 440 and tries again.

Once a successful connection is achieved (or after step 440), the client requests the server to start sending media data having the seek point and streaming media presentation data may begin to be received by the client computer 105a Thus, in a step 455, the client computer 105a may find a suitable switchover point, or "switchover time," for each track where the client computer will stop rendering data from the initial, failed, connection and begin rendering data from the new connection. In the illustrated embodiment, this is performed separately for each track in the presentation. Another embodiment determines one common switchover point over all tracks of the presentation. Once this switchover point is found, the client computer 105a, in a step 460, can begin presenting data for each track from the new connection once the joint time has occurred. At this point, the transition to the new connection is complete.

In one embodiment, the client computer 105a may find a "joint" for each track, which is a selected point in a stream of time-ordered packets where the time markers jump from one time to another. As an example, if a stream of data has four packets with a time marker of 10 and four at a time marker of 20, 20 is a jump point, and thus possibly a useful joint. Once this joint has been found, it can be used as the switchover point for that track. Jump points are desirable as switchover places because they allow the presentation software 107 to more reliably trust that it knows which data packets are to be rendered from that point on. As will be understood, if a point in time before a jump were to be chosen, e.g., from the example above, "15", there may or may not be data packets, e.g., from the example, some of the packets with time marker 10, that should be rendered starting at that point. Because it would take computing resources and time to determine this, it is desirable to simply choose a joint, as that will allow the client computer to know which packets are to be rendered. In another embodiment, the switchover point is determined using a unique identifier other than time markers, such as a packet sequencing marker. In such an embodiment, switchover times would not be determined on time jumps, but rather on matching up values from the relevant unique identifier in packets from both streams.

In the preferred embodiment, the joint may be chosen to be the first such jump point where all packets can be rendered on either side. Through this choice, the client computer can ensure that the switchover is transparent to a user. In the alternative, if the ideal joint cannot be done for one reason or another, the client computer 105a may elect to choose the first available jump point out of the data received from the new connection after time point of the interruption. This "default" joint is still useful, for while it may not provide a transparent viewing or listening experience, it still provides a "clean" point to begin rendering without requiring a user to take additional action. While the illustrated embodiment finds a separate joint for each track, alternate embodiments may choose a common joint over all tracks while still incorporating inventive aspects of the system.

Figure 6:
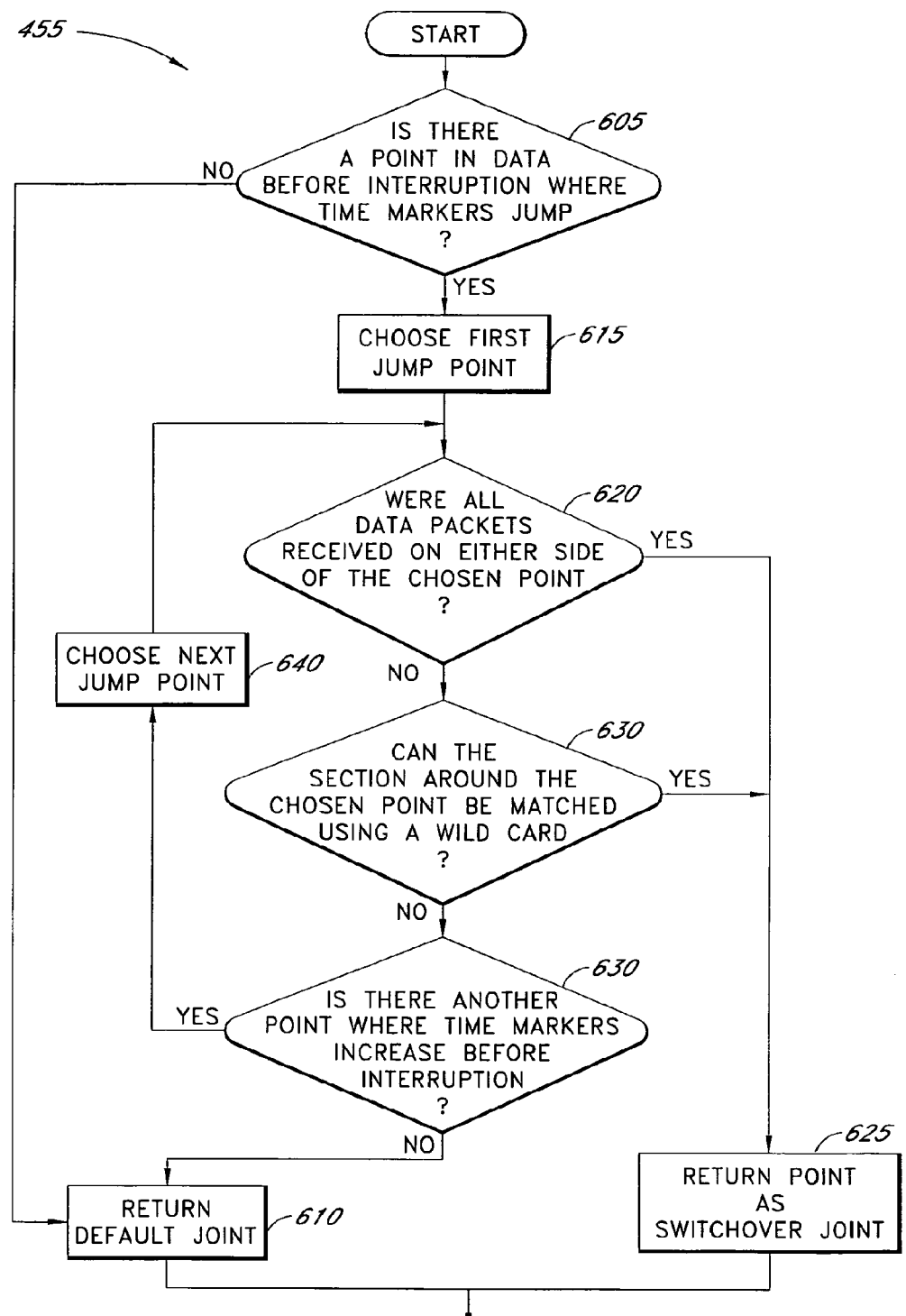
FIG. 6 is a flowchart illustrating, in one embodiment of the invention, a process that is performed by the client computers of FIG. 1 for selecting a point at which rendering can switch from data received over one network connection to data received over another network connection.

FIG. 6 is a flowchart illustrating an exemplary process through which the client software decides at what in a streaming media presentation the client software will switch rendering to the data received from a new network connection. FIG. 6 illustrates certain steps that occur in step 455 of FIG. 4. Depending on the embodiment, additional steps may be added, others removed, selected steps merged, and the ordering of the steps rearranged.

Beginning in a decision step 605, the client computer 105a analyzes data received via the new connection to determine if there is a point where time markers increase that exists before the interruption in the network connection. If the client computer 105a determines that there is not such a point, it returns the default joint at a step 610, as described above. If there is such a point, then at a step 615, the client computer chooses the first such jump point. Then, at a decision step 620, the client computer 105a looks at the data received from both the initial connection and the new connection to determine if every packet was received for both the time immediately preceding and immediately following the chosen point. If the client computer 105 determines that all of the packets where received via both connections, then the computer proceeds to a step 625, where it returns this point as the proper switchover point. The client computer can then begin rendering the data received over the new connection starting at the chosen switchover point. However, if there are packets missing from around the chosen point, the client computer 105a may proceed to a decision step 630, where it treats the missing packets as "wildcard" slots, and determines if it match up each packet in one stream with a corresponding packet or wildcard in the other so that every packet near the chosen point can be rendered. This method of substituting wildcards and matching will be recognized by one of ordinary skill in the art. If it the client computer 105a can match up the packets on either side of the chosen point, the client computer may then go to step 625 and return the point as the switchover point, as above.

If instead the client computer 105a cannot match up the packets, it may then go on through the received data to see if there is another desirable joint available. Thus, at a decision step 635, the client computer 105a looks at the received data to determine if there is another point available where the time markers increase before the interruption. If such a point exists, at a step 640 the client computer 105a then may find the next point where a time jump occurs and then returns to step 620 to test this new point for suitability. If there are no more jump points before the interruption, the client computer 105a may proceed to step 610 and return the default joint. The client computer then can begin rendering data received via the new connection beginning at the default joint.

Figure 7A:
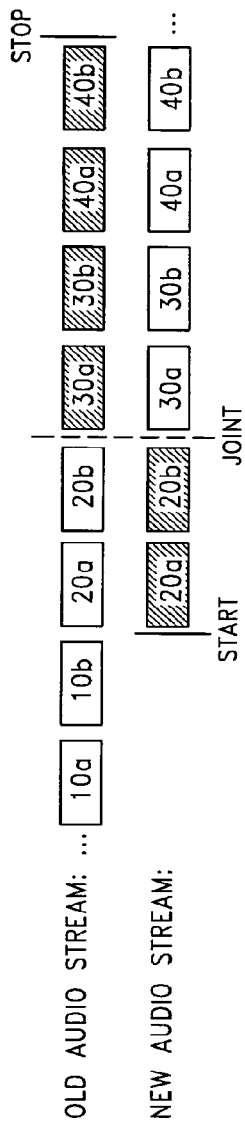
FIGS. 7A, 7B, and 7C are block diagrams illustrating exemplary data streams of disjointed packets.
Figure 7B:
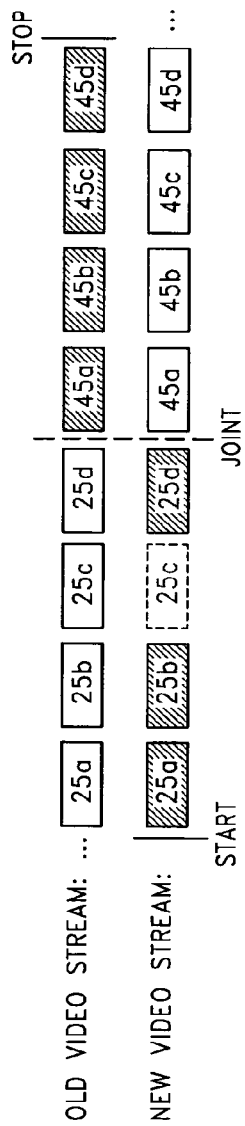
Figure 7C:
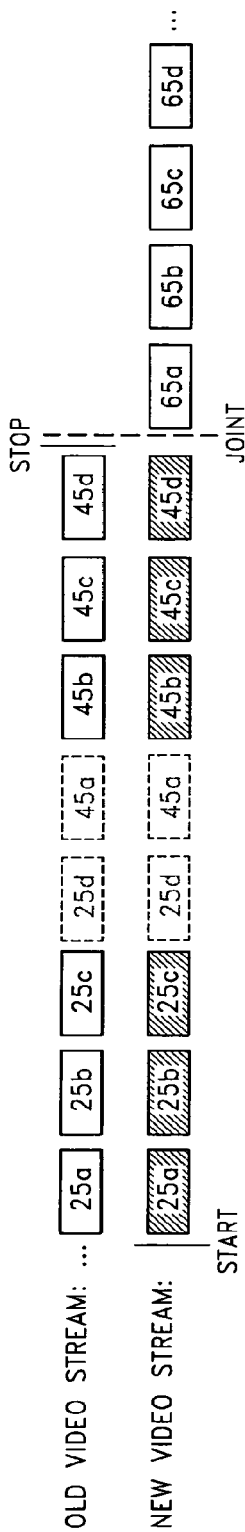

FIGS. 7A, 7B, and 7C illustrate examples of how the switchover point may be found between packet streams. These FIGS. 7A-7C demonstrate a series of data packets, not time markers. For ease of explanation, all of the packets in FIGS. 7A-7C are based off of a presentation having the same time markers and seek point qualities as are shown in FIG. 5. FIG. 7A demonstrates an ideal situation, where no packets have been lost from either connection, using the audio track illustrated in FIG. 5. In FIG. 7A, packets that are to be rendered are colored white, while packets that are to be discarded are shaded out. In this case, the client computer 105a selects as the joint the first point where the time markers jump; here it is the point where the packets jump from time marker 20 to time marker 30. Thus, it may render packets received from the initial connection until t=30, at which point it will continue on, rendering packets from the new connection.

FIG. 7B illustrates an example where a packet in the stream from the new connection is lost. Here the packets from the earlier-illustrated video stream are being used for the example. As above, the seek point illustrated is t=20, but because the first packets in the video stream after t=20 have time markers of 25, that is where the new stream appears to begin. In this example, one of the packets with time marker 25 from the new connection has been lost. In this occurrence, because the client computer 105a can observe that there may be a full set of four packets received over the initial connection with time marker 25, it may still decide to make the joint occur where the time marker jump from t=25 to t=45. Thus packets received from the initial connection may be rendered until t=45, at which point packets from the new connection are rendered.

FIG. 7C illustrates an example where packets have been lost from both the original stream and the stream from the new connection. In this case, because a full set of packets for t=25 or t=45 does not exist, the client computer 105a would like to avoid selecting a joint that involves these missing packets. Thus, in this case, the client computer 105a chooses the joint to be at the first point after the original connection ended where there is a skip in the time markers in the new connection. In the illustrated example, this point is t=65. Thus packets may be rendered from the original connection until t=65, at which point they will be rendered from the new connection.

The above-described system improves upon existing systems in a number of ways. First, it may allow a streaming media presentation to be continued to be rendered even after a network or system failure, without requiring any action on the part of a user. Second, it may allow for easier repair or maintenance of streaming media servers without disrupting media presentation to users. Finally, the system may provide a method of seamlessly switching from one networked media stream to another in a way that is transparent to a user.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of presenting streaming media data received from a remote data processing apparatus via a communications network, the method comprising:
    presenting with a client computer at least a portion of the streaming media data that is received via the communications network;
    detecting with the client computer an interruption to receiving the streaming media data, the interruption causing reception of the streaming media data to terminate;
    after the interruption, continuing to present as much of the data as was received prior to the termination of the reception;
    determining a connection time in which reconnection is expected to be established;
    determining a period of time where the streaming media data received prior to termination of the reception can be presented before the presentation of the received streaming media data is exhausted;
    waiting until the remaining rendering time of the presentation is the same as the connection time before reconnecting;
    reconnecting to the remote data processing apparatus via the communications network after detecting the interruption to receive at least a remainder of the streaming media data not yet received, wherein the reconnecting to the remote data processing apparatus comprises connecting to at least one alternate server to receive at least the remainder of the streaming media data with at least enough overlap between the streaming media data received from the at least one alternate server and the already received streaming media data to form an ostensibly continuous presentation; and
    presenting at least the received remainder of the streaming media data, so the prior presentation and the remainder presentation form an ostensibly continuous presentation of the streaming media data without visible or audible interruption.

2. The method of claim 1, wherein the received portion of the streaming media data is obtained by the client computer from the remote data processing apparatus via the communications network using a first network connection and the reconnecting to the remote data processing apparatus utilizes a different transport layer protocol than that utilized in the first network connection.

3. The method of claim 1, further comprising if the reconnect fails, attempting another reconnect to the processing apparatus via the communications network.

4. The method of claim 2, further comprising receiving a preference as to whether reconnection should be performed and wherein the reconnecting to the processing apparatus is only performed if the preference permits reconnection.

5. The method of claim 1, wherein the remote data processing apparatus comprises a plurality of servers configured to transmit streaming media data and wherein the connecting to the at least one alternate server further comprising:
    providing a server information list containing connection information for the at least one alternate server from which the streaming media data can be received;
    selecting the at least one alternate server from the list; and
    connecting to the selected at least one alternate server to receive streaming media data that overlaps at least a portion of the streaming media data already received.

6. The method of claim 1, wherein the determining the connection time is based at least in part on the amount of time needed to establish the reconnection with the remote data processing apparatus after the terminated reception.

7. The method of claim 2, wherein:
    the streaming media data comprises a plurality of discrete packets of media data that are presented in succession;
    each of the discrete packets has an associated time marker that defines when each discrete packet is to be presented relative to other packets from the plurality of discrete packets of the streaming media data; and
    wherein each of the packets has an associated track, such that all packets associated with a particular track can be presented without regard to any packet associated with any other track.

8. A computing device comprising a processor and memory having tangibly stored instructions thereon that, when executed by the processor, perform a method to maintain a streaming media data connection to the device after detecting a connection interruption, the method comprising:
    presenting streaming media data, the streaming media data being received over a data communications network from a first server; and
    responsive to an indication that transmission of the streaming media data over the communications network cannot be sustained or is below a predetermined rate, selecting a second server containing the streaming media data, determining a desired reconnection time based in part on playing time of received unrendered streaming media data and the reconnection time representing anticipated connection time for a new connection to be established with the selected second server so that reconnection creates at least enough overlap between the streaming media data received from the new connection and the streaming media data already received to form an ostensibly continuous presentation of the streaming media data without visible or audible interruption and connecting to said second server to receive streaming media data from the second server that overlaps at least a portion of the streaming media data already received from the first server whenever the unrendered playing time is equal and/or less than the desired reconnection time.

9. The device of claim 8, wherein the selecting further comprises selecting the second server from a list of server information containing connection information for at least one server configured to provide the streaming media data over a data communications network.

10. The device of claim 9, wherein the selecting and the connecting may also be responsive to an alert sent from a third server that an initial network connection will end and wherein the list of server information is obtained from the third server at the time of the alert.

11. The device of claim 8, wherein the method, responsive to the reconnection with the selected second server, further comprises comparing the data arriving after reconnection to the data already received before reconnection, and selecting a point at which the streaming media data will cease being presented from the streaming media data already received prior to reconnection, and will instead be presented from the streaming media data arriving after reconnection.

12. A method of automatically restoring a failed streaming media connection, the method comprising:
    connecting a client processing apparatus to a first streaming media server to receive a streaming media data over a data communications network;
    detecting with the client processing apparatus whether an initial network connection for transmission of the streaming media data being received via the data communications network can be sustained, or whether said initial network connection has transmission delays exceeding a predetermined amount;
    determining a desired reconnection time based in part on playing time of received unrendered streaming media data and the reconnection time representing anticipated connection time for a new network connection to be established so that reconnection creates at least enough overlap between the streaming media data received from the new connection and the streaming media data already received from the initial connection to form an ostensibly continuous presentation of the streaming media data without visible or audible interruption;
    establishing with the client processing apparatus the new network connection between the client processing apparatus and a reconnection streaming media server to resume reception of the streaming media data whenever the unrendered playing time is less than the desired reconnection time; and
    identifying a joint point in the streaming media data between information received via the new connection and information received prior to establishing the new connection.

13. The method of claim 12, further comprising:
    rendering the streaming media data received through the initial network connection; and
    after the new streaming media connection is created, switching to rendering the streaming media data received from the new network connection.

14. The method of claim 13, further comprising waiting a predetermined time before creating the new connection.

15. The method of claim 14, wherein the predetermined time is sufficient to begin a new connection and receive enough of the streaming media data from the new connection to switch to being rendered from the new connection in a manner that will be transparent to a user viewing the rendering.

16. The method of claim 14, wherein establishing the new network connection comprises:
    creating the new connection to start at least as early as the desired connection time in the streaming media data; and
    waiting to switch rendering from the streaming media data already received from the initial connection to rendering from the streaming media data received from the new connection until the desired connection time.

17. The method of claim 13, wherein the streaming media data comprises a plurality of discrete packets of media presentation data and wherein switching to rendering the streaming media data from the new network connection comprises:
    analyzing packets of the media presentation data received via the new network connection and packets of the media presentation data received from the first streaming media server to determine a joint time where rendering can be switched with minimum disruption; and
    switching rendering to the streaming media data received via the new connection at this joint time.

18. The method of claim 13, wherein:
    the streaming media data comprises a plurality of discrete packets of media presentation data that are rendered in succession to display the streaming media data;
    each of the packets has an associated time marker that defines when each packet is to be rendered relative to other packets from the presentation; and
    each of the packets has an associated track, such that all of the packets associated with a particular track can be rendered without regard to any packet associated with any other track.

* * * * *